United States Patent
Takita et al.

(10) Patent No.: US 6,245,272 B1
(45) Date of Patent: Jun. 12, 2001

(54) POLYOLEFIN MICROPOROUS FILM AND METHOD FOR PREPARING THE SAME

(75) Inventors: Kotaro Takita; Hidehiko Funaoka; Norimitsu Kaimai; Shigeaki Kobayashi, all of Yokohama; Koichi Kono, Asaka, all of (JP)

(73) Assignee: Tonen Chemical Corporation, Tokyo (JP)

( * ) Notice: Subject to any disclaimer, the term of this patent is extended or adjusted under 35 U.S.C. 154(b) by 0 days.

(21) Appl. No.: 09/673,456

(22) PCT Filed: Feb. 15, 2000

(86) PCT No.: PCT/JP00/00829

§ 371 Date: Dec. 1, 2000

§ 102(e) Date: Dec. 1, 2000

(87) PCT Pub. No.: WO00/49073

PCT Pub. Date: Aug. 24, 2000

(30) Foreign Application Priority Data

Feb. 19, 1999 (JP) .................................................. 11-041986

(51) Int. Cl.⁷ ............................. D06H 13/00; B29C 55/00
(52) U.S. Cl. ..................... 264/210.4; 264/41; 264/235.8; 264/290.2; 210/500.42; 521/79; 521/143; 429/254
(58) Field of Search ................................... 264/41, 210.4, 264/235.8, 290.2; 210/500.42; 521/79; 429/254

(56) References Cited

U.S. PATENT DOCUMENTS

| 4,828,772 | * | 5/1989 | Lopatin et al. | 264/45.9 |
| 6,153,133 | * | 11/2000 | Kalmal et al. | 264/41 |
| 6,172,163 | * | 1/2001 | Rein et al. | 525/240 |

\* cited by examiner

Primary Examiner—Morton Foelak
(74) Attorney, Agent, or Firm—Armstrong, Westerman, Hattori, McLeland and Naughton, LLP

(57) ABSTRACT

It is an object of the present invention to provide a microporous polyolefin membrane, high in elongation and porosity, low in shrinkage, and capable of improving battery characteristics, safety and productivity, when used for battery separators. The microporous polyolefin membrane of the present invention comprises (A) an ultra-high-molecular-weight polyolefin having a weight-average molecular weight of $5 \times 10^5$ or more, or (B) a composition containing an ultra-high-molecular-weight polyolefin having a weight-average molecular weight of $5 \times 10^5$ or more, and having a porosity of 45 to 95%, elongation at break of 300% or more, bubble point exceeding 980 KPa and thermal shrinkage in the TD direction of 3% or less. The present invention also provides a method for producing the above microporous polyolefin membrane.

3 Claims, No Drawings

POLYOLEFIN MICROPOROUS FILM AND METHOD FOR PREPARING THE SAME

TECHNICAL FIELD

This invention relates to a microporous membrane comprising an ultra-high-molecular-weight polyolefin or composition containing an ultra-high-molecular-weight polyolefin, more particularly to a microporous polyolefin membrane for battery separators, and also relates to a method for producing the same.

BACKGROUND OF THE INVENTION

Microporous polyolefin membranes are widely used in various applications such as battery separators (in particular, separators for lithium ion primary and secondary batteries, and large-sized batteries for electric vehicles or the like), capacitor separators, various separation membranes (e.g., for water treatment, ultrafiltration, microfiltration and reverse osmosis), various filters, and moisture-permeable/waterproof clothes or base materials therefor, because they are insoluble in organic solvents, and resistant to electrolytes and electrode-active materials.

One of the known methods for producing microporous polyolefin membranes is extraction process comprising the steps of mixing a polyolefin with an organic medium and inorganic powder (e.g., finely powdered silica), melting and molding the mixture, and extracting the organic medium and inorganic powder. This method needs a process of extracting the inorganic powder, and permeability of the membrane produced depends largely on particle size of the inorganic powder used and is difficult to control.

Recently, various processes have been proposed to produce high-strength, microporous membranes which contain an ultra-high-molecular-weight polyolefin. For example, Japanese Patent Application Laid-Open Nos. 60-242035, 61-195132, 61-195133, 63-39602, 63-273651, 3-64334 and 3-105851 disclose processes to produce microporous membranes by forming a gel-like sheet from a heated solution of a polyolefin composition containing an ultra-high-molecular-weight polyolefin dissolved in a solvent, stretching it while heating, and removing the solvent by extraction. These processes give the microporous polyolefin membranes characterized by a sharp pore size distribution and small pore size, which have been used for battery separators.

Recently, lithium ion batteries have been increasingly required to have higher battery characteristics, safety and productivity. Each battery system is required to have an optimum pore size, porosity and permeability for improved battery characteristics. In order to improve battery characteristics, it is generally essential to reduce energy loss by increasing separator permeability and decreasing ion migration resistance in a range that safety of the battery is securely kept. It should be noted that excessively increasing pore size helps accelerate formation of dendrite, possibly deteriorating safety of the battery. It is necessary, when the battery is subjected to a destructive test, the electrodes are securely kept apart from each other for safety reasons, even when the separator is deformed. Development of the microporous membrane satisfying the above conditions has been increasingly demanded.

It is an object of the present invention to provide a microporous polyolefin membrane, high in elongation and porosity, low in shrinkage, and capable of improving battery characteristics, safety and productivity, when used for battery separators.

DISCLOSURE OF THE INVENTION

The inventors of the present invention have found, after having extensively studied to solve the above-described problems, that a microporous polyolefin membrane well-balanced in properties (e.g., high in elongation and porosity and low in shrinkage) can be produced by extruding a solution of an ultra-high-molecular-weight polyolefin or composition containing an ultra-high-molecular-weight polyolefin dissolved in a solvent, and stretching the resultant gel-like extrudate, removing the solvent therefrom and thermally setting it under controlled conditions for the stretching and heat-setting processes, to reach the present invention.

Thus, the present invention provides a microporous polyolefin membrane comprising (A) an ultra-high-molecular-weight polyolefin having a weight-average molecular weight of $5 \times 10^5$ or more, or (B) a composition containing an ultra-high-molecular-weight polyolefin having a weight-average molecular weight of $5 \times 10^5$ or more, and having a porosity of 45 to 95%, tensile elongation of 300% or more, bubble point exceeding 980 KPa and thermal shrinkage in the TD direction of 3% or less.

The present invention also provides a method for producing a microporous polyolefin membrane, which comprises the steps of (a) preparing a solution comprising 10 to 50 wt.% of (A) an ultra-high-molecular-weight polyolefin having a weight-average molecular weight of $5 \times 10^5$ or more, or (B) a composition containing an ultra-high-molecular-weight polyolefin having a weight-average molecular weight of $5 \times 10^5$ or more, and 90 to 50 wt. % of a solvent, (b) extruding the solution, (c) quenching the extruded solution to have a gel-like extrudate, (d) biaxially stretching the gel-like extrudate at 116 to 125° C. at a stretching ratio of 2 or more in both MD and TD directions, (e) removing the solvent and drying the extrudate, and (f) heat-setting the extrudate at 115 to 120° C.

PREFERRED EMBODIMENTS OF THE INVENTION

The microporous polyolefin membrane of the present invention is described in more detail by constituent components, properties and method of production.

1. Polyolefin

The ultra-high-molecular-weight polyolefin (A) for the microporous polyolefin membrane of the present invention has a weight-average molecular weight of $5 \times 10^5$ or more, preferably in a range from $1 \times 10^6$ to $15 \times 10^6$. A polyolefin having a weight-average molecular weight less than $5 \times 10^5$ is undesirable for the present invention, because of anticipated deterioration of membrane strength.

The composition (B) containing an ultra-high-molecular-weight polyolefin having a weight-average molecular weight of $5 \times 10^5$ or more is not limited. One of the preferred examples of the composition (B) comprises an ultra-high-molecular-weight polyolefin (B-1) having a weight-average molecular weight of $1 \times 10^6$ or more, preferably $1.5 \times 10^6$ or more, more preferably in a range from $1.5 \times 10^6$ to $15 \times 10^6$, and a polyolefin (B-2) having a weight-average molecular weight of $1 \times 10^4$ or more but less than $1 \times 10^6$, preferably $1 \times 10^4$ or more but less than $5 \times 10^5$. It is necessary for the composition (B) to contain the ultra-high-molecular-weight polyolefin (B-1) at 1 wt. % or more, preferably 15 wt. % or more, more preferably in a range from 15 to 40 wt. % . The composition containing the ultra-high-molecular-weight polyolefin (B-1) at less than 1 wt. % will not give the microporous membrane of sufficient strength, because the molecular chains of the polyolefin (B-1) are scarcely entwined with each other. When the polyolefin (B-2) has a weight-average molecular weight less than $1 \times 10^4$, the microporous membrane produced tends to be broken.

Examples of the above-described polyolefins include crystalline homopolymers, two-stage polymers or copolymers of ethylene, propylene, 1-butene, 4methyl-pentene-1, 1-hexene, 1-octene, vinyl acetate, methyl methacrylate or styrene, or blends thereof. Preferable among them are polypropylene, polyethylene and compositions thereof. Polyethylenes may be of high density, low density or medium density. Of these, the preferable ones are the compositions comprising an ultra-high-molecular-weight polyolefin (B-1) having a weight-average molecular weight of $1 \times 10^6$ or more and high-density polyethylene (B-2) having a weight-average molecular weight of $1 \times 10^4$ or more but less than $5 \times 10^5$.

Low-density polyethylene may be incorporated as the polyolefin which imparts a shut-down function to the membrane, to improve its characteristics for battery separators. The low-density polyethylene useful for the present invention includes linear low-density polyethylene (LLDPE) produced by the medium pressure method, low-density polyethylene (LDPE) produced by the high pressure method, and ethylene/α-olefin copolymer produced in the presence of a single site catalyst.

The polypropylenes useful for the present invention include block and random copolymers, in addition to the homopolymer. The block and random copolymers may be incorporated with another type of α-olefin other than propylene. One of the preferred α-olefins is ethylene. Incorporation of polypropylene can improve melt-down temperature and as a result, characteristics of the membrane for battery separators can be improved.

The microporous polyolefin membrane of the present invention may be further incorporated with a low-molecular-weight polyethylene having a weight-average molecular weight of 1000 to 4000 as an optional component to improve its characteristics for battery separators. In such a case, its content is preferably kept at 20 wt. % or less, based on the whole polyolefin composition, because the polyolefin of insufficient weight-average molecular weight tends to cause breakdown of the microporous membrane, as described above.

The above-described polyolefin or polyolefin composition has a molecular weight distribution (weight-average molecular weight/number-average molecular weight) of 300 or less, preferably 5 to 50. The molecular weight distribution of above 300 is undesirable, because the membrane comprising such a composition may suffer breakdown by the lower molecular weight components to lose its strength as a whole. When the polyolefin composition is used, the desirable molecular weight distribution can be obtained by adequately mixing an ultra-high-molecular-weight polyolefin having a weight-average molecular weight of $1 \times 10^6$ or more and a polyolefin having a weight-average molecular weight of $1 \times 10^4$ or more but less than $1 \times 10^6$. The composition may be produced by a multi-stage process or mixing two or more types of polyolefin, so long as it has the above molecular weight and molecular weight distribution.

The above-described polyolefin or polyolefin composition may be incorporated, if required, with various additives such as antioxidants, ultraviolet absorbers, antiblocking agents, pigments, dyes, inorganic fillers, etc., and also with a polymer capable of imparting a shut-down function at low temperature, when the microporous polyolefin membrane is to be used for, e.g., lithium battery separators, within limits not harmful to the object of the present invention.

2. Microporous Polyolefin Membrane (1) Properties

The microporous polyolefin membrane of the present invention has the following properties:

(i) Porosity

The microporous polyolefin membrane of the present invention has a porosity of 45 to 95%, preferably 50 to 80%. Porosity beyond the above-described range is undesirable. At below 45%, the membrane may be insufficient in ion conductivity for battery separators, deteriorated in battery characteristics, e.g., battery capacity and cycle characteristics, especially at low temperature. At above 95%, on the other hand, strength of the membrane itself is insufficient.

(ii) Elongation at Break

The microporous polyolefin membrane of the present invention has elongation at break of 300% or more. Elongation at break below 300% is undesirable for a battery separator membrane, because the separator deformation may not follow irregularities on the electrodes, burrs, battery deformation or the like, to possibly cause a short circuit between the electrodes.

(iii) Bubble Point

The microporous polyolefin membrane of the present invention has a bubble point above 980 KPa, preferably 1,470 KPa or higher, more preferably 9,800 KPa or higher. Bubble point below 980 KPa is undesirable for a battery separator microporous polyolefin membrane, because such a membrane may have excessively large pores to accelerate formation of dendrite, possibly causing various troubles, e.g., voltage drop and self-discharge.

(iv) Thermal Shrinkage

It is necessary for the microporous polyolefin membrane of the present invention to have a thermal shrinkage of 3% or less in the TD direction. When it is to be used for a battery separator, thermal shrinkage above 3% in the TD direction is undesirable, because the electrode may be exposed when the battery is heated at an abnormally high rate.

Thermal shrinkage is preferably 5% or less in the MD direction.

(v) Average Pore Diameter

The microporous polyolefin membrane of the present invention has pores preferably having an average diameter of 0.01 to 0.1 μm, more preferably 0.01 to 0.05 μm. At an average diameter below 0.01 μm, the membrane may have an excessively low permeability. At above 0.1 μm, on the other hand, the membrane tends to suffer short circuit resulting from formation of dendrite, when it is used for a battery separator.

(vi) Air Permeability

The microporous polyolefin membrane of the present invention preferably has an air-permeability of 400 sec/100 cc or less, more preferably 50 to 400 sec/100 cc. Keeping air-permeability at 400 sec/100 cc or less for the microporous polyolefin membrane can improve its ion transmission capacity and hence output characteristics, when it is used for a battery separator.

(vii) Tensile Strength

The microporous polyolefin membrane of the present invention preferably has a tensile strength of 49,000 KPa or more both in the MD and TD directions. The microporous polyolefin membrane having a tensile strength of 49,000 KPa or more will not be broken, when used for a battery separator, and hence is desirable.

The microporous polyolefin membrane of the present invention, having the above-described properties, is high in elongation, permeability, strength and bubble point and low in thermal shrinkage. In spite of its relatively small average pore diameter of 0.01 to 0.1 μm, it is high in porosity and conversely high in permeability because of the sharp pore size distribution. These properties make the membrane of the present invention suitable for, e.g., battery separators and liquid filters.

(2) Production of the Microporous Polyolefin Membrane

The method for producing the microporous polyolefin membrane of the present invention comprises steps of (a) mixing a resin component of a polyolefin or polyolefin composition, incorporated, as required, with a polymer or the like which imparts a shut-down effect at low temperature to the membrane, with an organic liquid or solid, (b) melting, kneading and extruding the mixture, (c) stretching the resultant extrudate, (d) removing the solvent from the extrudate, and (e) drying and heat-setting the extrudate. One of the preferred embodiments for producing the microporous polyolefin membrane of the present invention comprises preparing a solution of polyolefin or polyolefin composition by supplying it with a good solvent for the polyolefin, extruding the solution through a die into sheets, cooling the sheets to form the gel-like composition, stretching the gel-like composition under heating, removing the residual solvent from the composition, and drying and heat-setting the composition.

In the present invention, the solution of polyolefin or polyolefin composition as the stock is prepared by dissolving the polyolefin or polyolefin composition in a solvent while heating. Any solvent can be used, so long as it can sufficiently dissolve the polyolefin. Examples of the solvents include aliphatic or cyclic hydrocarbons such as nonane, decane, undecane, dodecane, paraffin oils, etc., and fractions of mineral oils having boiling points substantially equal to those of the above hydrocarbons. A nonvolatile solvent, e.g., paraffin oil, is preferable for forming the stable gel-like shape.

Dissolution of the polyolefin or polyolefin composition while heating is carried out by stirring its solution at a temperature at which it is completely dissolved in the solvent, or uniformly mixing the composition and solvent with each other in an extruder. When the polyolefin or polyolefin composition is to be dissolved in the solvent with stirring, the dissolving temperature varies depending on the types of polymers and solvents used. It is in the range of 140 to 250° C. in the case of polyethylene composition. It is preferable to effect the dissolution in an extruder, when a high-concentration solution of the polyolefin composition is used to produce a microporous membrane.

When the dissolution is to be effected in an extruder, the polyolefin or polyolefin composition is first charged in the extruder to be molten, at a temperature preferably 30 to 100° C. above melting point of the polyolefin, although varying depending on type of the polyolefin used, where melting point is determined by DSC in accordance with JIS K 7211. For example, it is 160 to 230° C., preferably 170 to 200° C., in the case of polyethylene, and 190 to 270° C., preferably 190 to 250° C., in the case of polypropylene. Then, a liquid solvent is added to the molten polyolefin or polyolefin composition in the middle of the extruder.

The concentration of the polyolefin or polyolefin composition is 10 to 50 wt. % based on the total of the polyolefin or polyolefin composition and solvent, preferably 10 to 40 wt. %, more preferably 10 to 35 wt. %, or conversely the concentration of the solvent is 90 to 50 wt. %, preferably 90 to 60 wt. %, more preferably 90 to 65 wt. %. When the polyolefin or polyolefin composition concentration is less than 10 wt. % (or the solvent concentration is more than 90 wt. %), swelling and neck-in are likely to take place at the exit of a die in the process of forming sheets. Accordingly, it is difficult to keep good molding processability and self-supporting characteristics of the sheet produced. Another disadvantage is decreased productivity resulting from longer time required to remove the solvent. On the other hand, when the polyolefin or polyolefin composition concentration is more than 50 wt. % (or the solvent concentration is less than 50 wt. %), the target microposrous membrane of high elongation may not be produced, and sheet will suffer deteriorated molding processability. It is possible to control permeability of the membrane by changing the polyolefin or polyolefin composition concentration in the above range.

Next, the heated solution of the molten and kneaded polyolefin or polyolefin composition is extruded directly or by another extruder through a die or the like, in such a way to secure the final membrane thickness of 5 to 250 μm.

Usually used as a die is a sheet die having a rectangular orifice, but a double-pipe hollow die, an inflation die, etc. may be used. When the sheet die is used, a die gap is usually 0.1 to 5 mm, and heated at 140 to 250° C. in the extrusion process. In this case, an extrusion speed is usually 20–30 cm/minute to 15 m/minute.

The solution extruded through the die is formed into a gel-like sheet by quenching. It is cooled to 90° C. or below, preferably to 80 to 30° C., at a speed of at least 50° C./minute by cooling the die or gel-like sheet. As a method of cooling the gel-like sheet, direct contact with cooling air, cooling water or other cooling media, contact with a roll cooled by a coolant, etc. may be employed. Contact with a cooled roll is a preferable method.

The gel-like sheet is then biaxially stretched under heating by an ordinary method, such as a tenter, roll, calender method or a combination thereof at a given stretching ratio. It may be stretched in the machine and transmachine directions simultaneously or sequentially. The simultaneous stretching is more preferable.

The stretching temperature is 116 to 125° C., preferably 116 to 123° C. If the stretching temperature exceeds 125° C., the molecular orientation by stretching does not take place because the resin melts, and as a result, membrane porosity may decrease. If the stretching temperature is below 116° C., on the other hand, the resin is softened insufficiently, with the result that the membrane tends to break during the stretching process and stretching ratio cannot be well controlled. Elongation of the microporous membrane will be also insufficient.

The stretching ratio should be set at 2 or more for both MD and TD directions, preferably 3 or more.

The stretched sheet is then washed with a solvent to remove the residual solvent. It is then dried and heat-set. Solvents used for this solvent-removing treatment may be volatile ones, including hydrocarbons such as pentane, hexane and heptane; chlorinated hydrocarbons such as methylene chloride and carbon tetrachloride; fluorinated hydrocarbons such as trifluoroethane; and ethers such as diethyl ether and dioxane. These volatile solvents may be used individually or in combination, and their selection depends on the types of the nonvolatile solvents used to dissolve the polyolefin composition. Washing methods with the solvents include an extraction method with solvents, a method of spraying solvents or a combination thereof.

The washing of the stretched sheet with a solvent should be performed to such an extent that the content of the residual solvent is less than 1 wt. %. The stretched sheet is finally dried to remove the washing solvent by a heating method, an air-drying method, etc.

The dried sheet is thermally set at 115 to 120° C. At below 115° C., strength of the microporous membrane may be insufficient. At above 120° C., on the other hand, thermal shrinkage of the membrane may be excessively high, to decrease its elongation. It is preferable to heat-set the membrane in such a way to shrink its width to 10% or less. This treatment should improve membrane elongation. Shrinking the width beyond 10% is undesirable, because of possible deterioration of membrane permeability.

The microposrous membrane having the desired properties can be produced by the above-described procedure. It may be subjected, if necessary, to a hydrophilic treatment by plasma irradiation, impregnation with a surface active agent, surface grafting, etc. for surface modification.

EXAMPLES AND COMPARATIVE EXAMPLES

The present invention is described in more detail by the following preferred embodiments, which by no means limit the present invention. The properties cited in the preferred embodiments were determined by the following test methods:
(1) Weight-average molecular weight and molecular weight distribution: Determined by gel permeation chromatography, where chromatograph: Waters' analyzer, column: Tosoh's GMH-6, solvent: o-dichlorobenzene, temperature: 135° C., and flow rate: 1.0 ml/min
(2) Membrane thickness: Determined by a stylus type thickness meter (Mitsutoyo Litematic)
(3) Air permeability: Measured according to JIS P8117
(4) Average pore diameter: Determined by the nitrogen gas adsorption
(5) Porosity: Determined by the weight method
(6) Pin puncture strength: Determined by puncturing the sample with a pin (diameter: 1 mm, or 0.5 mm R) at 2 mm/second, to find the load at which it is broken
(7) Tensile strength and elongation at break: Determined by finding the breaking strength and elongation of a 10 mm wide rectangular sample, tested according to ASTM D822
(8) Bubble point: Determined according to ASTM E-128-61 with the sample put in ethanol. When it exceeds the upper limit, the term "No" is reported, by which is meant that it exceeds 14,700 KPa.
(9) Thermal shrinkage: Determined for both MD and TD directions, after exposing the sample to an atmosphere kept at 105° C. for 8 hours
(10) Impedance: Determined by an impedance analyzer (Solartron) at 1 KHz for real part of impedance, wherein the membrane was placed between the metallic electrodes (16 mm in diameter) and immersed in an electrolytic solution. The electrolytic solution was prepared by dissolving 1 mol LiClO4 in a 1:1 mixed solution of propylene carbonate and 1,2-dimethoxyethane in an argon atmosphere.

Example 1

A polyethylene mixture, comprising 18 wt. % of an ultrahigh-molecular-weight polyethylene (UHMWPE) having a weight-average molecular weight of $2.0 \times 10^6$ and 82 wt. % of a high-density polyethylene (HDPE) having a weight-average molecular weight of $3.5 \times 10^5$, and having a Mw/Mn ratio of 16.8 and melting point of 135° C., was incorporated with 0.375 wt. parts of an antioxidant based on 100 wt. parts of the polyethylene mixture, to prepare a polyethylene composition. Ten (10) wt. parts of the polyethylene composition was fed to a biaxial extruder (58 mm in diameter, L/D ratio=42, high kneading type), and 90 wt. parts of liquid paraffin was also fed to the biaxial extruder from the side feeder, to prepare a polyethylene solution in the extruder by melting the polyethylene composition and kneading it with the liquid paraffin at 200° C. and 200 rpm. The resulting solution was extruded from the T-die attached at the extruder end in such a way to have 50 to 60 $\mu$m as thickness of the following stretched membrane, and taken up by a cooling roll, kept at 50° C., to prepare a gel-like sheet. The sheet was then biaxially stretched at 118° C. at a stretching ratio of 5×5, to have the stretched membrane. The resulting membrane was washed with methylene chloride to remove the residual liquid paraffin by extraction, dried and heat-set for 10 seconds to prepare a 25 $\mu$m thick microporous polyethylene membrane. The properties of the membrane are shown in Table 1.

Eamples 2 to 15

Microporous polyolefin membranes were prepared in the same manner as in EXAMPLE 1 except that UHMWPE and HDPE were used in ratios shown in Tables 1 and 2, and stretching temperature and ratios shown in Tables 1 and 2 were used. The properties of the microporous polyethylene membranes are shown in Tables 1 and 2. All of the polyethylene compositions had a melting point of 135° C.

TABLE 1

| | | | EXAMPLES | | | | | | | |
|---|---|---|---|---|---|---|---|---|---|---|
| | | | 1 | 2 | 3 | 4 | 5 | 6 | 7 | 8 |
| Polyethylene compositions | UHMWPE | Mw | $2.0 \times 10^6$ | $2.0 \times 10^6$ | $2.0 \times 10^6$ | $2.0 \times 10^6$ | $2.0 \times 10^6$ | $2.0 \times 10^6$ | $2.0 \times 10^6$ | $2.0 \times 10^6$ |
| | | wt % | 18 | 18 | 19 | 19 | 30 | 30 | 40 | 40 |
| | HDPE | Mw | $3.5 \times 10^5$ | $3.5 \times 10^5$ | $3.5 \times 10^5$ | $3.5 \times 10^5$ | $3.5 \times 10^5$ | $3.5 \times 10^5$ | $3.5 \times 10^5$ | $3.5 \times 10^5$ |
| | | wt % | 82 | 82 | 82 | 82 | 70 | 70 | 60 | 60 |
| PE concentration in the solution | | wt% | 10 | 20 | 25 | 35 | 10 | 25 | 20 | 20 |
| Stretching conditions | Temperature | ° C. | 118 | 121 | 122 | 123 | 116 | 118 | 118 | 118 |
| | Stretching ratio | MD × TD | 5 × 5 | 5 × 5 | 5 × 5 | 5 × 5 | 5 × 5 | 5 × 5 | 5 × 3 | 3 × 3 |
| Heat-Setting | Temperature | ° C. | 120 | 120 | 120 | 120 | 120 | 120 | 120 | 120 |
| Properties of microporous membranes | Thickness | $\mu$m | 25 | 25 | 25 | 25 | 25 | 25 | 25 | 25 |
| | Air permeability | sec | 189 | 255 | 277 | 376 | 175 | 254 | 224 | 186 |
| | Average pore diameter | $\mu$m | 0.038 | 0.035 | 0.035 | 0.036 | 0.032 | 0.032 | 0.039 | 0.044 |

TABLE 1-continued

|  |  | EXAMPLES | | | | | | | |
|---|---|---|---|---|---|---|---|---|---|
|  |  | 1 | 2 | 3 | 4 | 5 | 6 | 7 | 8 |
| Porosity | % | 51 | 48 | 45 | 45 | 52 | 47 | 45 | 51.5 |
| Pin puncture strength | mN | 3600 | 3800 | 4500 | 5740 | 3870 | 4480 | 2900 | 2290 |
| Tensile (MD) strength (TD) | Kpa | 72700 50960 | 79500 54500 | 98600 86300 | 110900 91500 | 77300 57000 | 85200 61100 | 63200 41500 | 65100 43610 |
| Elongation (MD) at break (TD) | % | 322 568 | 303 521 | 310 511 | 306 515 | 436 764 | 384 695 | 445 896 | 462 923 |
| Bubble point | Kpa | No | No | No | No | No | No | No | No |
| Thermal (MD) shrinkage (TD) | % | 3.3 1.8 | 4.5 2.5 | 4.4 2.8 | 4.9 3 | 3.8 2.5 | 4.4 3 | 3.7 1.1 | 3.1 1 |
| Impedance | $\Omega/cm^2$ | 2 | 2.4 | 2.4 | 2.6 | 1.9 | 2.3 | 2.2 | 1.9 |

TABLE 2

|  |  |  | EXAMPLES | | | | | | |
|---|---|---|---|---|---|---|---|---|---|
|  |  |  | 9 | 10 | 11 | 12 | 13 | 14 | 15 |
| Polyethylene compositions | UHMWPE | Mw wt % | $2.0 \times 10^6$ 40 | $2.0 \times 10^6$ 2 | $2.0 \times 10^6$ 98 | $4.0 \times 10^6$ 18 | $4.0 \times 10^6$ 30 | $2.0 \times 10^6$ 30 | $2.0 \times 10^6$ 40 |
|  | HDPE | Mw wt % | $3.5 \times 10^5$ 60 | $3.5 \times 10^5$ 98 | $3.5 \times 10^5$ 2 | $5.0 \times 10^4$ 82 | $5.0 \times 10^4$ 70 | $3.5 \times 10^5$ 70 | $3.5 \times 10^5$ 60 |
| PE concentration in the solution | | wt % | 25 | 25 | 15 | 15 | 15 | 20 | 20 |
| Stretching conditions | Temperature | °C. | 118 | 118 | 117 | 120 | 122 | 117 | 117 |
|  | Stretching ratio | MD × TD | 4 × 4 | 5 × 5 | 5 × 5 | 5 × 5 | 5 × 5 | 5 × 3 | 5 × 3 |
| Heat-setting | Temperature | °C. | 120 | 120 | 120 | 120 | 120 | 120* | 120* |
| Properties of microporous membranes | Thickness | μm | 25 | 25 | 25 | 25 | 25 | 25 | 25 |
|  | Air permeability | sec | 267 | 398 | 244 | 366 | 345 | 230 | 224 |
|  | Average pore diameter | μm | 0.039 | 0.037 | 0.03 | 0.031 | 0.03 | 0.041 | 0.039 |
|  | Porosity | % | 51.5 | 51 | 51.8 | 51.3 | 53.5 | 45 | 45 |
|  | Pin puncture strength | mN | 3300 | 3600 | 4410 | 1333 | 4540 | 2790 | 3000 |
|  | Tensile (MD) strength (TD) | Kpa | 69800 49980 | 72700 51000 | 79200 59200 | 74200 55600 | 79400 58800 | 65200 50200 | 65200 51300 |
|  | Elongation (MD) at break (TD) | % | 376 698 | 322 568 | 411 622 | 443 620 | 467 643 | 428 884 | 445 896 |
|  | Bubble point | Kpa | No | No | No | No | No | No | No |
|  | Thermal (MD) shrinkage (TD) | % | 4 1.8 | 3.5 2 | 3 1.2 | 3.4 2.2 | 3.3 2.3 | 4 2.2 | 4.2 2.1 |
|  | Impedance | $\Omega/cm^2$ | 2.4 | 2.6 | 2.3 | 2.5 | 2.4 | 2.2 | 2.2 |

*: Width shrinkage in the TD direction was set at 8% during the thermally setting process.

Comparative Example 1

A microporous polyethylene membrane was prepared in the same manner as in EXAMPLE 1 except that polyethylene concentration in the solution was set at 20 wt. %, and stretching temperature and heat-setting temperature were set at 117 and 123° C., respectively. The properties of the membrane are shown in Table 3.

Comparative Example 2

A microporous polyethylene membrane was prepared in the same manner as in EXAMPLE 1 except that polyethylene concentration in the solution was set at 20 wt. %, and the stretching process was omitted. The properties of the membrane are shown in Table 3.

Comparative Example 3

A microporous polyethylene membrane was prepared in the same manner as in EXAMPLE 1 except that UHMWPE/HDPE ratio was set at 20/80 by weight, and stretching temperature and heat-setting temperature were set at 120 and 122° C., respectively. The properties of the membrane are shown in Table 3. The polyethylene composition had a melting point of 135° C.

Comparative Example 4

A microporous polyethylene membrane was prepared in the same manner as in EXAMPLE 1 except that UHMWPE/HDPE ratio was set at 5/95 by weight, and stretching temperature and heat-setting temperature were set at 115 and 118° C., respectively. The properties of the membrane are shown in Table 3. The polyethylene composition had a melting point of 135° C.

TABLE 3

| | | | COMPARATIVE EXAMPLES | | | |
|---|---|---|---|---|---|---|
| | | | 1 | 2 | 3 | 4 |
| Polyethylene compositions | UHMWPE | Mw | $2.0 \times 10^6$ | $2.0 \times 10^6$ | $2.0 \times 10^6$ | $2.0 \times 10^6$ |
| | | wt % | 18 | 18 | 20 | 5 |
| | HDPE | Mw | $3.5 \times 10^5$ | $3.5 \times 10^5$ | $3.5 \times 10^5$ | $3.5 \times 10^5$ |
| | | wt % | 82 | 82 | 80 | 95 |
| PE concentration in the solution | | wt % | 20 | 20 | 30 | 30 |
| Stretching conditions | Temperature | °C. | 117 | — | 120 | 115 |
| | Stretching ratio | MD × TD | 5 × 5 | no | 5 × 5 | 5 × 5 |
| Heat-setting | Temperature | °C. | 123 | 120 | 122 | 118 |
| Properties of microporous membranes | Thickness | μm | 25 | 25 | 25 | 25 |
| | Air permeability | sec | 775 | 25 | 430 | 380 |
| | Average pore diameter | μm | 0.03 | 0.45 | 0.03 | 0.032 |
| | Porosity | % | 37 | 70 | 40 | 46 |
| | Pin puncture strength | mN | 4900 | 1180 | 4116 | 4410 |
| | Tensile strength (MD) | Kpa | 102900 | 19600 | 93100 | 102900 |
| | (TD) | | 83300 | 15700 | 78400 | 83300 |
| | Elongation (MD) | % | 180 | 1100 | 305 | 180 |
| | at break (TD) | | 350 | 1200 | 500 | 295 |
| | Bubble point | Kpa | No | 490 | No | No |
| | Thermal shrinkage (MD) | % | 4 | 2 | 8 | 10 |
| | (TD) | | 2.5 | 0.5 | 6 | 7 |
| | Impedance | Ω/cm² | 3.6 | 1.2 | 2.2 | 2 |

Industrial Applicability

As described in detail, the microporous polyolefin membrane of the present invention comprises an ultra-high-molecular-weight polyolefin or composition containing an ultra-high-molecular-weight polyolefin, and is high in elongation, permeability, strength and bubble point and low in thermal shrinkage, and, in spite of its relatively small average pore diameter of 0.01 to 0.1 μm, high in porosity and conversely high in permeability because of the sharp pore size distribution. These properties make the membrane of the present invention suitable for, e.g., battery separators and liquid filters.

What is claimed is:

1. A method for producing the microporous polyolefin membrane having a weight-average molecular weight of $5 \times 10^5$ or more, and having a porosity 45 to 95%, tensile elongation of 300% or more, bubble point exceeding 980 Kpa and thermal shrinkage in the TD direction of 3% or less which comprises the steps of (a) preparing a solution comprising 10 to 50 wt. % of (A) an ultra-high-molecular-weight polyolefin having a weight-average molecular weight of $5 \times 10^5$ or more, or (B) a composition containing an ultra-high-molecular-weight polyolefin having a weight-average molecular weight of $5 \times 10^5$ or more, and 90 to 50 wt. % of a solvent, (b) extruding the solution, (c) quenching the extruded solution to have a gel-like extrudate, (d) biaxially stretching the gel-like extrudate at 116 to 125° C. at a stretching ratio of 2 or more in both MD and TD directions, (e) removing the solvent and drying the extrudate, and (f) heat-setting the extrudate at 115 to 120° C.

2. The method for producing the microporous polyolefin membrane according to claim 1, wherein said composition (B) containing an ultra-high-molecular-weight polyolefin having a weight-average molecular weight of $5 \times 10^5$ or more comprises 15 to 100 wt. % of an ultra-high-molecular-weight polyolefin having a weight-average molecular weight of $1 \times 10^6$ or more and 0 to 85 wt. % of a high-density polyethylene having a weight-average molecular weight of $1 \times 10^4$ or more but less than $5 \times 10^5$.

3. The method for producing the microporous polyolefin membrane according to claim 1 or 2, wherein said heat-setting step involves shrinkage of membrane width to 10% or less at least in one of MD and TD directions.

* * * * *